US00RE38691E

(19) United States
(12) Reissued Patent
Tsuruta et al.

(10) Patent Number: US RE38,691 E
(45) Date of Reissued Patent: Feb. 1, 2005

(54) FLYWHEEL ASSEMBLY WITH ANNULAR ELASTIC BODY FOR REDUCING VIBRATIONS

(75) Inventors: Hiroyoshi Tsuruta, Neyagawa (JP); Hirotaka Fukushima, Neyagawa (JP)

(73) Assignee: Kabushiki Kaisha Daikin Seisakusho, Osaka (JP)

(21) Appl. No.: 09/076,838

(22) Filed: May 13, 1998

Related U.S. Patent Documents

Reissue of:
(64) Patent No.: 5,515,745
Issued: May 14, 1996
Appl. No.: 08/186,771
Filed: Jan. 26, 1994

(30) Foreign Application Priority Data

Jan. 27, 1993 (JP) ..... 5-001705 U
Feb. 18, 1993 (JP) ..... 5-005169 U

(51) Int. Cl.[7] ..... F16F 15/315
(52) U.S. Cl. ..... 74/572; 192/200
(58) Field of Search ..... 74/572, 574; 192/200

(56) References Cited

U.S. PATENT DOCUMENTS 4,280,608 A 7/1981 LaBuda et al. ..... 192/113 B
4,871,342 A * 10/1989 Boss et al. ..... 464/98
5,253,740 A * 10/1993 Kohno et al. ..... 192/70.16
5,355,747 A * 10/1994 Kajitani et al. ..... 74/573 F

FOREIGN PATENT DOCUMENTS

| | | | |
|---|---|---|---|
| DE | 3343506 | 6/1985 | |
| DE | 4117584 | 12/1991 | |
| DE | 3343506 | 12/1992 | |
| DE | 4309570 | 9/1993 | |
| EP | 0475366 | 3/1992 | |
| JP | 61233242 | * 10/1986 | ..... 74/572 |
| JP | 62141335 | * 6/1987 | ..... 74/572 |
| JP | 2118228 | * 5/1990 | ..... 74/574 |

* cited by examiner

*Primary Examiner*—Thomas R. Hannon
(74) *Attorney, Agent, or Firm*—Shinjyu Global IP Counselors, LLP

(57) ABSTRACT

A flywheel assembly comprises a flywheel having a friction surface, a flexible plate, and a stopper plate serving as a stopper mechanism. The above-described flexible plate is flexible in the bending direction and rigid in the rotational direction, and has a radially outer portion fixed to the flywheel and a radially inner portion fixable to an end of a crankshaft of an engine. The stopper plate is for restraining bending deflection of the flexible plate when it exceeds a predetermined amount.

38 Claims, 7 Drawing Sheets

FLYWHEEL ASSEMBLY WITH ANNULAR ELASTIC BODY FOR REDUCING VIBRATIONS

Matter enclosed in heavy brackets [ ] appears in the original patent but forms no part of this reissue specification; matter printed in italics indicates the additions made by reissue.

BACKGROUND

1. Technical Field

The present invention relates generally to a flywheel assembly, and more particularly, to a flywheel assembly having a flexible plate for elastically connecting an engine crankshaft with a flywheel.

2. Description of the Background (1) A bending force is exerted on the crankshaft when an engine converts a combustion force Into torque. A flywheel mounted on an end of the crankshaft is thus subjected to bending vibration by the bending of the crankshaft. Subsequently, this vibration force is further transmitted to the engine block, which vibrates the whole body of the vehicle through the engine mount. Consequently, noise is produced at the time of acceleration.

In order to reduce such noise at the time of acceleration, vibration of the flywheel must be reduced. Therefore, the flywheel in conventional devices have been supported by a flexible plate. The flexible plate is high in rigidity in the direction of rotation, while being low in rigidity in the direction of bending vibration.

The flexible plate Is more effective in reducing bending vibration the lower its rigidity. A shifting of the peak resonance point away from the actual use range by employing this kind of low-rigidity flexible plate makes it possible to reduce noise at the time of engine acceleration. However, by lowering rigidity in the direction of the bending vibration the thickness of the flexible plate can be made too small. The respectively higher stress on the flexible plate can act to shorten its life. Subsequently, degradation of clutch disengagement characteristics may occur due to rigidity in the direction of the bending vibration being too low, thereby causing axial movement of the flywheel during the clutch release operation.

(2) A flywheel is mounted on the end of an engine crankshaft of, for example, an automobile. In some cases the flywheel is directly mounted on the end of the crankshaft and in other cases the flywheel is mounted on the end of the crankshaft through a flexible plate. When the flywheel is mounted on the end of the crankshaft through a flexible plate, radially inner portion of the flexible plate is fixed to the end of the crankshaft and radially outer portion of the flexible plate is fixed to the flywheel.

Furthermore, a friction surface is formed on a side surface of the flywheel for pressure contact with friction facings of a clutch disk of a clutch device which is mounted on the radially outer portion of the flywheel.

Friction between the friction surface and the friction facings generates heat in the apparatus. This frictional heat causes, for example, abnormal wear of the friction facings and early degradation of their performance characteristics. In the case of a flywheel mounted on the end of the crankshaft through the flexible plate, the cavity between the flywheel and the flexible plate is particularly liable to be filled with heat.

SUMMARY OF THE INVENTION

It is an object of the present Invention to reduce noise at the time of acceleration without degrading clutch disengagement characteristics.

It is another object of the present invention to restrain the effect of frictional heat on friction facings.

(1) A flywheel assembly according to one aspect of the present invention is for transmitting torque from a crankshaft of an engine to a friction member of a clutch disk assembly; and comprises a flywheel having a friction surface for pressure contact with a friction member of a clutch disk, a flexible plate deflectable in the axial direction parallel to the crankshaft and rigid in the rotational direction of the crankshaft and the flywheel. The flexible plate has radially outer portion fixed to the flywheel and radially inner portion adapted to be fixed to an end of an engine crankshaft. The flywheel assembly also comprises a stopper mechanism for restraining the bending deflection of the flexible plate when the amount of the bending deflection of the flexible plate exceeds a predetermined amount.

In the flywheel assembly of the present invention, if a relatively small bending vibration is transmitted from the engine crankshaft, the flexible plate is deflected to absorb the bending vibration. However, if deflection of the flexible plate exceeds a predetermined amount due to a large bending vibration, the deflection of the flexible plate is then restrained by the stopper mechanism.

In this flywheel assembly, it is possible to reduce noise at the time of acceleration without degrading disengagement characteristics. The reason is that even if the rigidity of the flexible plate is made relatively lower in the flywheel assembly of the present invention compared with those of conventional devices, the stopper mechanism can restrain deflection of the flexible plate when it exceeds a predetermined amount.

(2) A flywheel assembly according to another aspect of the present invention is for transmitting torque from a crankshaft of an engine to a friction member of a clutch disk assembly, and comprises a flywheel having a friction surface which a friction member of a clutch disk can be brought into pressure contact with. The flywheel also has a plurality of through holes for venting off heat generated on said friction surface. The assembly further comprises a flexible plate deflectable in the axial direction and rigid In the rotational direction. The flexible plate has its radially outer portion fixed to the flywheel and It also has a plurality of through holes for venting heat away from the flywheel; its radially inner portion is connectable to an engine crankshaft.

In the flywheel assembly, holes are respectively formed in the flywheel and the flexible plate to generate air flow. This air flow cools the flywheel assembly, thus decreasing temperature in and around the flywheel. Consequently, it is possible to repress abnormal wear of the clutch disk friction members and premature degradation of performance characteristics due to heat.

The foregoing and other objects and advantages of the present invention will become more apparent from the following detailed description with reference, to the accompanying drawings.

DESCRIPTION OF THE PREFERRED EMBODIMENTS

Figure 1:
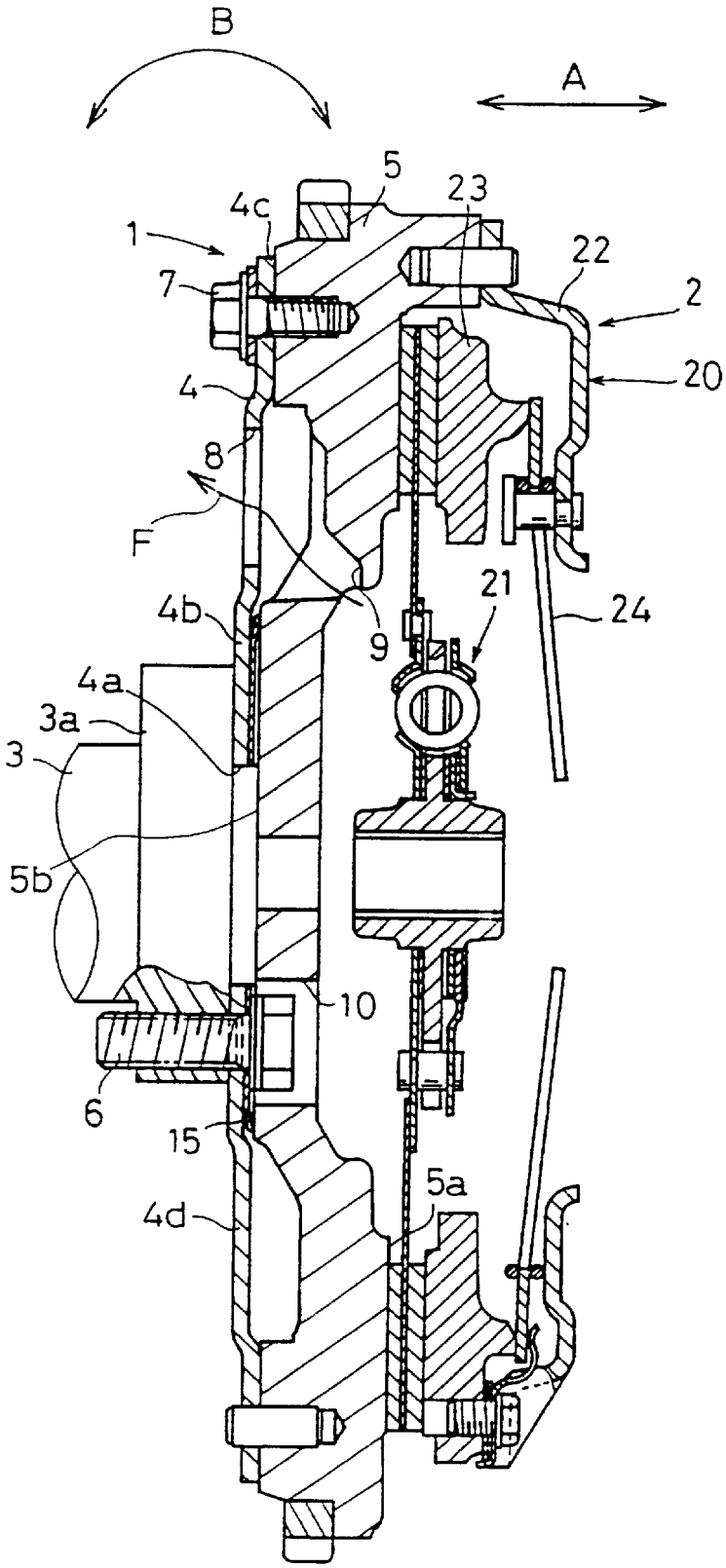
FIG. 1 is a sectional view showing a clutch device employing a flywheel assembly according to an embodiment of the present invention.

FIG. 1 shows a flywheel assembly 1 employing one embodiment of the present invention and a clutch device 2 mounted on the flywheel assembly 1. The flywheel assembly 1 Is mounted on an end of a crankshaft 3 extending from the engine, and comprises a flexible plate 4, a flywheel 5, and a stopper plate 15.

The flexible plate 4 is disk-shaped and has a hole 4a in its central portion. The flexible plate 4 deflectable is in the axial direction parallel to the crankshaft (B in FIG. 1) and rigid in the rotational direction of the crankshaft and flywheel. Its radially inner portion 4b is fixed to an end surface flange 3a of the crankshaft 3 by bolts 6, and Its radially outer portion 4c is fixed to the flywheel 5 by bolts 7. A plurality of vent holes 8 equally spaced in the circumferential direction are formed in an Intermediate portion 4d between the radially inner portion 4b and the radially outer portion 4c.

The flywheel 5 is an approximately disk-shaped member, a radially inward side surface 5b of which is flat and close to the end face of the crankshaft 3. Friction surface 5a is formed on the opposite lateral side on a radially outward portion of the flywheel 5, and a plurality of holes 9 are formed radially inward of the friction surface 5a and are equally spaced in the circumferential direction. Also, to avoid interference between the flywheel 5 and the heads of the bolts 6, holes 10 are formed radially inward of holes 9. That is, the holes 10 cover the heads of the bolts 6 so that the radially inner portion 4b can be disposed close to the flywheel 5.

Figure 3:
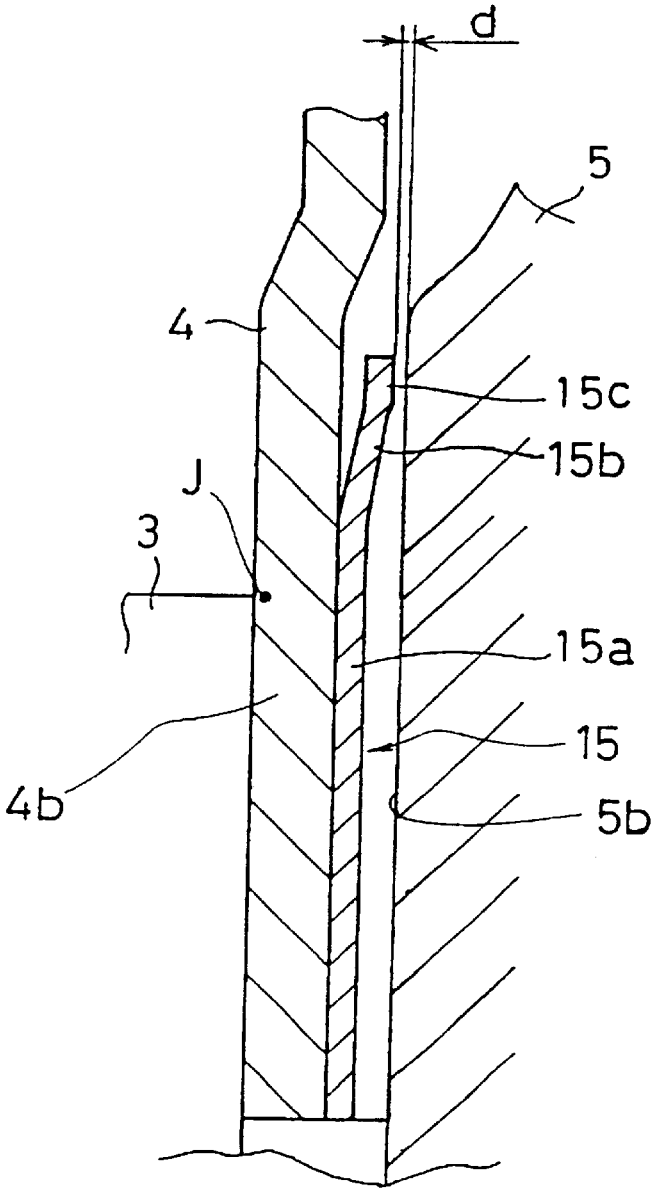
FIG. 3 is a partial enlarged view showing the flywheel assembly described above in FIG. 1.
Figure 4:
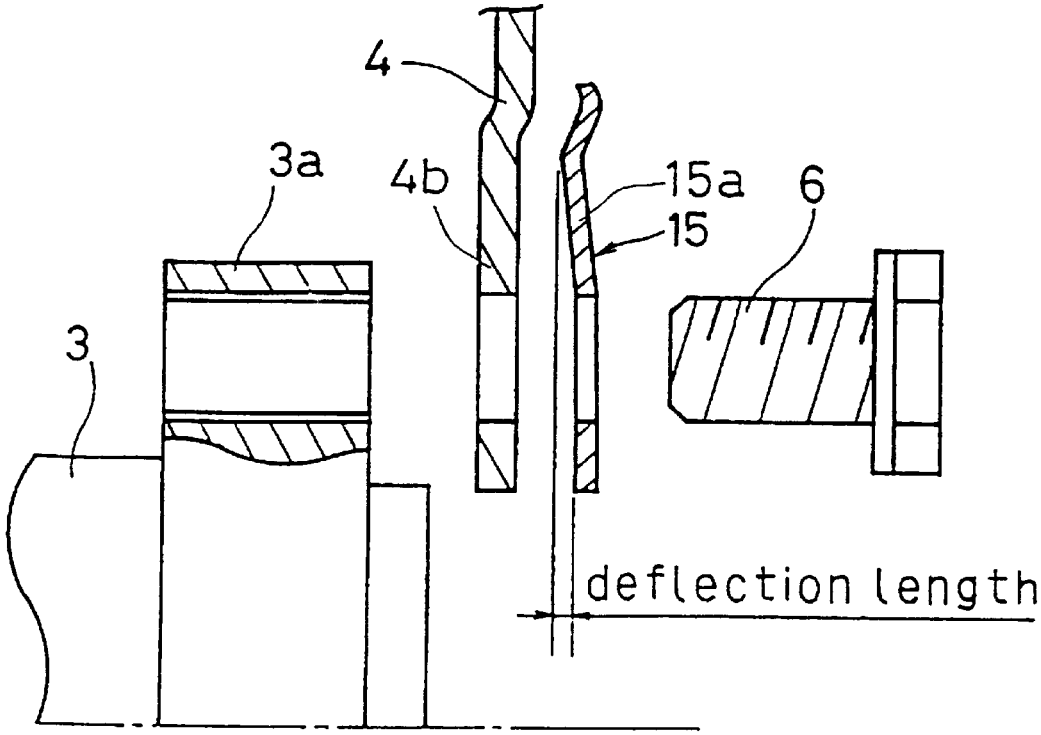
FIG. 4 is a partial enlarged view showing a flywheel assembly.

The stopper plate 15 is disposed between the radially inner portion 4b of the flexible plate 4 and the side surface 5b of the flywheel 5. The stopper plate 15 is washer-shaped and elastic, it is formed with a disk portion 15a, a radially outer portion 15b circumferentially outside the disk portion 15a, and the flat surface portion 15c circumferentially outside the radially outer portions 15b. The disk portion 15a is fixed to the flexible plate 4 by the bolts 6. As shown in FIG. 4, in the state where the stopper plate 15 is not yet fixed to the flexible plate 4, the disk portion 15a of the stopper plate 15 has a deflection allowance where its radially outer portion bends toward the flexible plate 4. Therefore, when the stopper plate 15 is fixed to the flexible plate 4 by bolts 6 in FIG. 3, radially outward portion 15b of the disk portion 15a elastically urges the radially inner portion 4b of the flexible plate 4 toward the crankshaft. Thus, the initial load is applied to the radially Inner portion 4b of the flexible plate 4 by the stopper plate 15. In this state, the radially outward portion of the disk portion 15a can deflect with the flexible plate 4. The deflection of the disk portion 15a stops when the flat surface portion 15c abuts against the side surface 5b of the flywheel. The outer diameter of the disk portion 15a is made larger than that of the flange 3a of the crankshaft 3.

Figure 2:
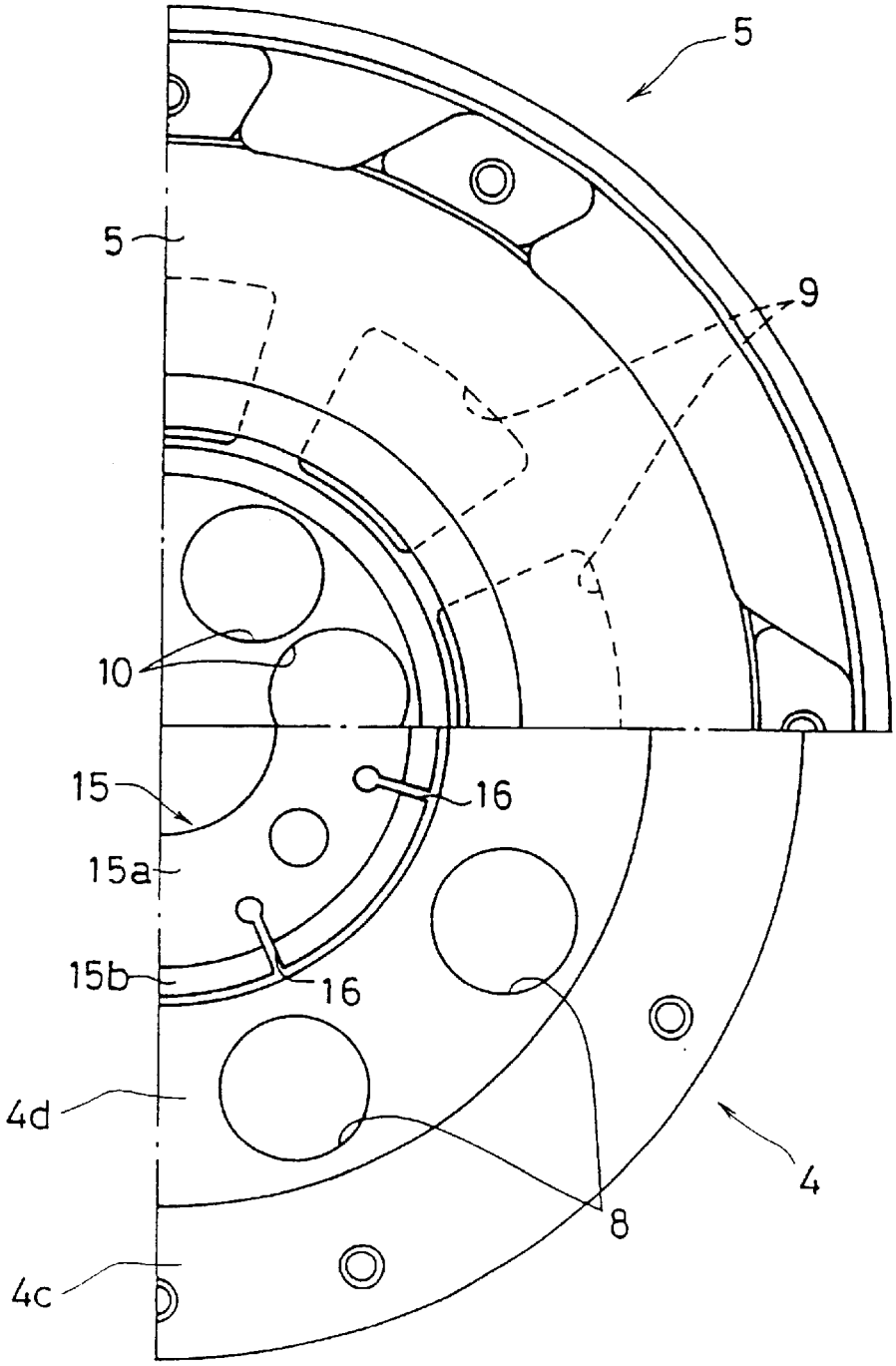
FIG. 2 is a partial sectional view showing the above described flywheel assembly.

In the attached position, the radially outer portion 15b and the flat surface portion 15c of the stopper plate 15 are formed to make predetermined angles with respect to the flywheel 5. Radially outer portion 15b bends toward the flywheel 5, and flat surface portion 15c is parallel to the side surface 5b of the flywheel. Furthermore, a plurality of radial slits 16 are formed equally spaced in the circumferential direction at the radially outer portion 15b, the flat surface portion 15c, and the radially outward portion of the disk portion 15a, as shown in FIG. 2. So constructed, the stopper plate 15 has a high rigidity in the clutch release direction(the axial direction A shown in FIG. 1) and low rigidity in the bending direction B in FIG. 1. However, the rigidity in the axial direction of the radially outer portion 15b is higher compared to the rigidity in the axial direction of the flexible plate 4.

Since the outer diameter of the stopper plate 15 is made larger than that of the flange 3a of the crankshaft 3, the deformation of the flexible plate 4 is repressed making it possible to distribute stress at the stress-concentrated portion J of the flexible plate 4 in contact with the radially outer edge of the flange 3a. In addition, when large bending vibrations occur, the stopper plate 15 abuts with stability against the side surface 5b of the flywheel 5. The frictional damping force generated thereby further act to dampen the bending vibration. Their abutment is sound and frictional damping force does not change with time due to the flat construction of flat surface portion 15c of the stopper plate 15.

Meanwhile, the flexible plate 4 and the flywheel 5 are disposed to form a gap between the radially inner portion 4b of the flexible plate 4 and the side surface 5b the flywheel 5. The flat surface portion 15c of the stopper plate 15 has a clearance d in the free state and does not abut against the side surface 5b of the flywheel 5 (see FIG. 3).

The clutch device 2 consists of a clutch cover assembly 20 and a clutch disk assembly 21 which is disposed in the clutch cover assembly 20. The clutch cover assembly 20 has a clutch cover 22 fixed to the radially outer portion of the flywheel 5, a pressure plate 23 for interposing the clutch disk assembly 21 between the pressure plate 23 and the friction surface 5a of the flywheel 5, and a diaphragm spring 24 for pressing the pressure plate 23.

Figure 5:
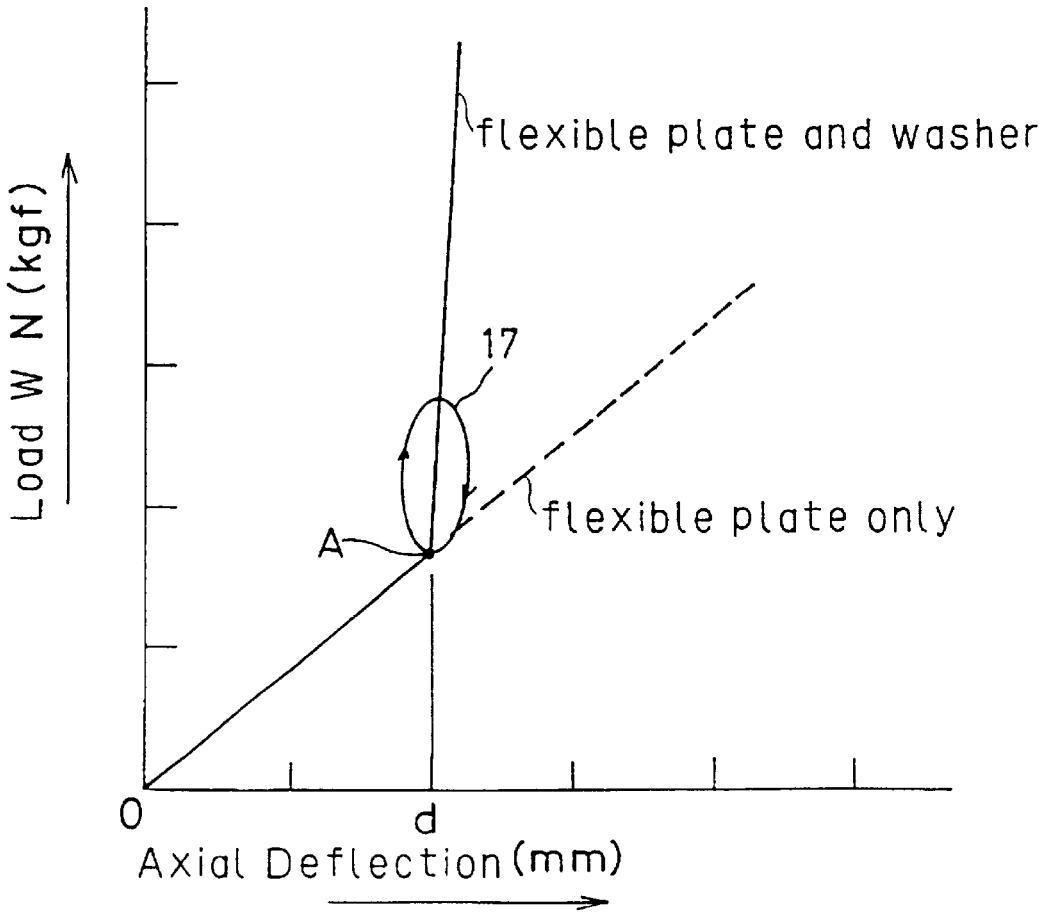
FIG. 5 is a graph showing flexible characteristic of the flywheel assembly.

Operations of the stopper plate 15 of the present invention will now be explained with reference to deflection characteristics of the flexible plate 5, shown in FIG. 5.

An input bending moment from the engine is transmitted to the flywheel 5 through the flexible plate 4. Then, in a state where the deflection of the flexible plate 4 is small due to a small bending vibration and where the radially outer end of the stopper plate 15 does not yet abut against the flywheel 5, deflection characteristics (points 0 to A in FIG. 5) are obtained according to the deflection characteristics of the flexible plate 4 and the stopper plate 15. Consequently, the surface vibration of the flywheel 5 is restrained, which makes it possible to restrain partial wear of the friction facings of the clutch disk assembly 21.

When amplitude of the bending vibration increases along with the vibrational angle of the flexible plate 4, the flexible plate 4 is greatly deflected. When the amount of that deflection at the radially outer end of the stopper plate 15 exceeds a certain level, then a part of the flat surface portion 15c of the stopper plate 15 is brought into pressure contact with the side surface 5b of the flywheel 5. The vibration amplitude is then suppressed by the rigidity of the stopper plate 15 and also by the spring-like characteristics of the flexible plate 4 (represented by the deflection characteristics from point A on in FIG. 5). Simultaneously, hysteresis torque 17 (shown in FIG. 5) is generated by a frictional damping force produced by the contact between the flat surface portion 15c of the stopper plate 15 and the side surface 5b of the flywheel 5, so that the bending vibration is dampened by the hysteresis torque 17.

Two-state characteristics are thus obtained by the stopper plate 15 and the flexible plate 4. Consequently, the rigidity of the flexible plate 4 can be made lower without degrading clutch disengagement characteristics, in contrast to the conventional example. It is thereby possible to efficiently absorb the bending vibration transmitted to the flywheel 5 using stopper plate 15 as a stopper mechanism for suppressing the deformation of the flexible plate 4. Furthermore, suppressing excessive deflection of the flexible plate 4 makes it possible to improve the durability of the flexible plate 4.

Figure 6:
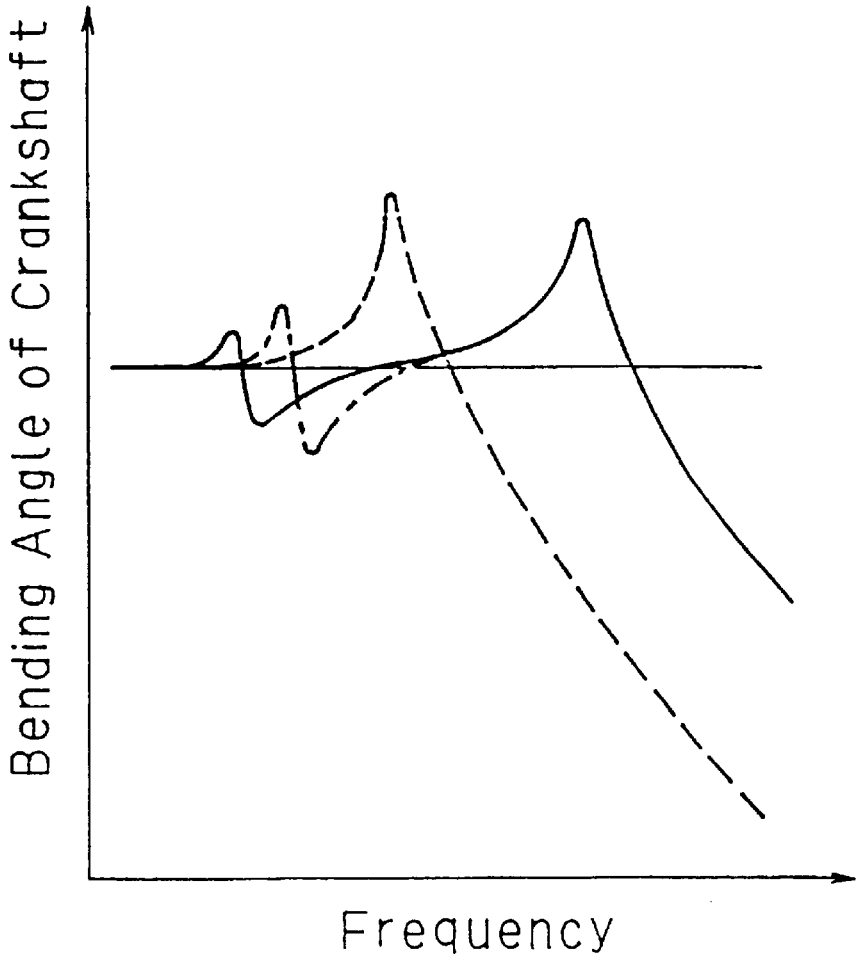
FIG. 6 is a graph showing bending angle of a crankshaft versus frequency characteristics in the above described flywheel assembly.

FIG. 6 shows vibrational characteristics of the crankshaft. The broken line represents the vibrational characteristics of the conventional flywheel without using a flexible plate, a one dot and dash line represents the vibrational characteristics when the conventional flexible plate is used, and a solid line represents the vibrational characteristics when a flywheel assembly according to the present invention is used. The conventional flywheel assembly with the flexible plate makes it possible to shift the resonance point away from the actual use range toward the higher frequency side. The vibrational characteristics of the conventional flywheel assembly with a flexible plate has a second resonance point in the lower frequency side. The flywheel assembly according to the present invention, which can utilize a flexible plate 4 having a lower rigidity than the conventional flexible plate, makes it possible to shift a second resonance point toward the lower frequency side. The interval between bending vibrations with large amplitudes is thereby expanded, making it possible to reduce noise during engine acceleration.

Figure 7:
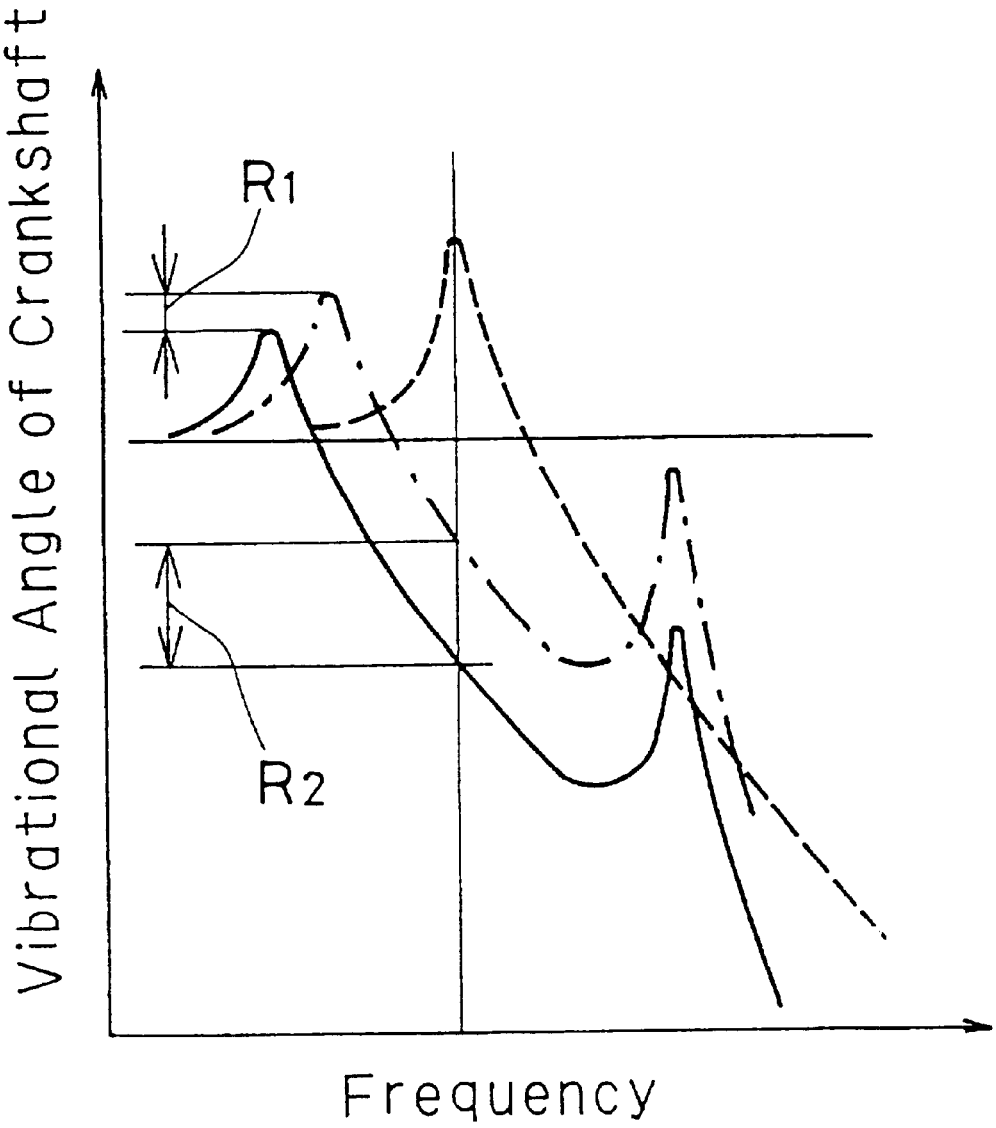
FIG. 7 is a graph showing bending angle of a flywheel versus frequency characteristics in the above described flywheel assembly.

Meanwhile, FIG. 7 shows vibrational characteristics of the flywheel where the broken line represents vibrational characteristics of the conventional flywheel without a flexible plate, a one dot and dash line represents vibrational characteristics when the conventional flexible plate is used, and a solid line represents the vibrational characteristics of the flywheel assembly according to the present invention. The vibrational angle of the flywheel assembly according to the present invention at the resonance point in the lower frequency region, as apparent from FIG. 7, is smaller than that of the conventional flywheel by $R_1$ because the stopper plate 15 restrains the deflection amount of the flexible plate 4. Thus use of the stopper plate makes it possible to reduce vibration of a clutch pedal. Furthermore, in the flywheel assembly 1 according to the present invention, the vibrational angle of the flywheel 5 is smaller than that of the conventional flywheel by $R_2$ in the actual use range because the stopper plate 15 stabilizes the flexible plate 4, reducing normal deflection. Consequently, clutch disengagement characteristics can be improved.

Since the radially outward portion 15b of the stopper plate 15 elastically urges the flexible plate 4 toward the engine side, the effect for restraining the deformation of the flexible plate 4 is further increased, thereby making it possible to further reduce stress in the flexible plate 4.

In such a construction, heat is generated when the clutch disk assembly 21 engages against the friction surface 5a of the flywheel 5. In the present embodiment, however, the holes 8 and 9, formed respectively in the flexible plate 4 and the flywheel 5, constitute a passage for air flow F shown in FIG. 1. Accordingly, heat developed by the flywheel 5 is cooled by air flowing through the passage. Consequently, it is possible to restrain abnormal wear of the friction facings and early degradation of characteristics due to heat, thus lengthening the life of the clutch disk assembly 21.

Furthermore, as the number and the size of the holes 8 in the flexible plate 4 may be varied, rigidity in the bending direction of each respective plate may be different.

Various details of the Invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A flywheel assembly for transmitting torque from a crankshaft of an engine to a friction member of a clutch disk assembly, comprising:

a flywheel having a friction surface for engagement with the friction member of the clutch disk assembly;

a flexible plate deflectable in an axial direction parallel to the crankshaft and rigid in a rotational direction of the crankshaft and the flywheel, having a radially outer portion fixed to said flywheel and a radially inner portion adapted to be fixed to an end of said crankshaft;

a stopper mechanism for restraining a bending deflection of the flexible plate when the amount of the bending deflection of said flexible plate exceeds a predetermined amount, said stopper mechanism including an elastic stopper disposed between said flexible plate and said flywheel, and part of said elastic stopper abuts against the flexible plate and the flywheel when the amount of the bending deflection of said flexible plate exceeds the predetermined amount, said elastic stopper being fixed to said flexible plate maintaining a predetermined amount of space between said elastic stopper and said flywheel, said elastic stopper being disposed between said radially inner portion of said flexible plate and a radially inner portion of said flywheel, said elastic stopper being flexible in an axial direction parallel to the crankshaft and having a portion whose axial rigidity is higher than the axial rigidity of said flexible plate, said elastic stopper elastically urges said radially inner portion of said flexible plate toward said crankshaft, and said elastic stopper being a washer-shaped spring having a radially inner portion connected to said radially inner portion of said flexible plate and having a plurality of slits extending radially from a radially outermost edge.

2. A flywheel assembly according to claim 1, wherein said washer-shaped spring has a disk portion including said radially inner portion, said disk portion urging said radially inner portion of said flexible plate toward said crankshaft.

3. A flywheel assembly according to claim 2, wherein the outside diameter of said disk portion is larger than the diameter of the end of said crankshaft which is adapted to contact said flexible plate.

4. A flywheel assembly according to claim 3, wherein said washer-shaped spring has an annular inclined portion around said disk portion inclined toward said flywheel, said annular inclined portion having axial rigidity greater than the axial rigidity of said flexible plate.

5. A flywheel assembly according to claim 4, wherein said washer-shaped spring has an annular flat surface portion around said annular inclined portion, and said flywheel is provided with a flat surface opposing said annular flat surface portion of said washer-shaped spring.

6. A flywheel assembly according to claim 5, wherein said flexible plate has a hole for adjusting its said axial rigidity.

7. A flywheel assembly according to claim 6, further comprising a plurality of bolts adapted to connect said radially inner portion of said flexible plate to said end of said crankshaft, and said flywheel is formed with a plurality of holes to cover heads of said bolts, whereby interference between said bolts and said flywheel is avoided.

8. A flywheel assembly according to claim 7, wherein said flywheel is provided with at least one hole for venting heat generated on said friction surface.

*9. A flywheel assembly for transmitting torque from a crankshaft of an engine to a friction member of a clutch disk assembly, comprising:*

*a flywheel having a friction surface for engagement with the friction member of the clutch disk assembly and a side surface facing in an axial direction which is opposite said friction surface;*

*a flexible plate deflectable in an axial direction parallel to the crankshaft and rigid in a rotational direction of the crankshaft and said flywheel, having a radially outer portion fixed to said flywheel and a radially inner portion adapted to be fixed to an end of the crankshaft; and*

*a washer-shaped spring having a radially inner portion adapted to be fixed to the end of the crankshaft adjacent to said flexible plate and a radially outer portion spaced axially from an adjacent portion of said flexible plate such that said radially outer portion of said washer-shaped spring extends away from said adjacent portion of said flexible plate, said radially outer portion of said washer-shaped spring extending toward said flywheel, said washer-shaped spring being configured for restraining movement of said flywheel when said flexible plate undergoes bending deflection, such that said radially outer portion engages said side surface of said flywheel and said washer-shaped spring being disposed between said flexible plate and said flywheel, said radially outer portion of said washer-shaped spring being formed with a plurality of slits extending radially from a radially outermost edge thereof.*

*10. A flywheel assembly for transmitting torque from a crankshaft of an engine to a friction member of a clutch disk assembly, comprising:*

*a flywheel having a friction surface for engagement with the friction member of the clutch disk assembly and a side surface facing in an axial direction which is opposite said friction surface;*

*a flexible plate deflectable in an axial direction parallel to the crankshaft and rigid in a rotational direction of the crankshaft and said flywheel, having a radially outer portion fixed to said flywheel and a radially inner portion adapted to be fixed to an end of the crankshaft; and*

*a washer-shaped spring having a radially inner portion adapted to be fixed to the end of the crankshaft adjacent to said flexible plate and a radially outer portion spaced axially from an adjacent portion of said flexible plate such that said radially outer portion of said washer-shaped spring extends away from said adjacent portion of said flexible plate, said radially outer portion of said washer-shaped spring extending toward said flywheel, said washer-shaped spring being disposed between said flexible plate and said flywheel, said radially outer portion of said washer-shaped spring being configured for friction engagement with said side surface of said flywheel for producing a frictional damping force therewith, and said washer-shaped spring being configured for restraining movement of said flywheel when said flexible plate undergoes bending deflection, such that said radially outer portion engages said side surface of said flywheel, said radially outer portion of said washer-shaped spring being formed with a plurality of slits extending radially from a radially outermost edge thereof.*

*11. A flywheel assembly for transmitting torque from a crankshaft of an engine to a friction member of a clutch disk assembly, comprising:*

*a flywheel having a friction surface for engagement with the friction member of the clutch disk assembly and a side surface facing in an axial direction which is opposite said friction surface;*

*a flexible plate deflectable in an axial direction parallel to the crankshaft and rigid in a rotational direction of the crankshaft and said flywheel, having a radially outer portion fixed to said flywheel and a radially inner portion adapted to be fixed to an end of the crankshaft; and*

*a washer-shaped spring having a radially inner portion adapted to be fixed to the end of the crankshaft adjacent to said flexible plate and a radially outer portion spaced axially from an adjacent portion of said flexible plate such that said radially outer portion of said washer-shaped spring extends away from said adjacent portion of said flexible plate, said radially outer portion of said washer-shaped spring extending toward said flywheel, said washer-shaped spring being disposed between said flexible plate and said flywheel, said washer-shaped spring being configured for restraining movement of said flywheel when said flexible plate undergoes bending deflection, such that said radially outer portion engages said side surface of said flywheel,*

*said radially inner portion of said washer-shaped spring including a conical section, said radially inner portion being configured for engagement with said flexible plate when said washer-shaped spring is installed on the crankshaft, said washer-shaped spring being configured to be deformable upon installation on the crankshaft such that said conical section is elastically changed such that said radially inner portion is flattened out against an adjacent surface of said flexible plate putting said washer-shaped spring in a pre-stress state, said radially outer portion of said washer-shaped spring being formed with a plurality of slits extending radially from a radially outermost edge thereof.*

*12. A flywheel assembly for transmitting torque from a crankshaft of an engine to a friction member of a clutch disk assembly, comprising:*

*a flywheel having a friction surface for engagement with the friction member of the clutch disk assembly and a side surface facing in an axial direction which is opposite said friction surface;*

*a flexible plate deflectable in an axial direction parallel to the crankshaft and rigid in a rotational direction of the crankshaft and said flywheel, having a radially outer portion fixed to said flywheel and a radially inner portion adapted to be fixed to an end of the crankshaft; and*

*a washer-shaped spring having a radially inner portion adapted to be fixed to the end of the crankshaft adjacent to said flexible plate and a radially outer portion spaced axially from an adjacent portion of said flexible plate such that said radially outer portion of said*

*washer-shaped spring extends away from said adjacent portion of said flexible plate, said radially outer portion of said washer-shaped spring extending toward said flywheel, said washer-shaped spring being configured for restraining movement of said flywheel when said flexible plate undergoes bending deflection, such that said radially outer portion engages said side surface of said flywheel and said washer-shaped spring being disposed between said flexible plate and said flywheel.*

*13. The flywheel assembly according to claim 12, wherein said radially inner portions of said washer-shaped spring and said flexible plate are formed with circumferentially spaced apart bolt holes, and a plurality of bolts are adapted to extend through said bolt holes and connect said radially inner portions of said washer-shaped spring and said flexible plate to the end of the crankshaft.*

*14. The flywheel assembly according to claim 13, wherein said flywheel is formed with a plurality of holes to cover heads of said bolts, whereby interference between said bolts and said flywheel is avoided.*

*15. The flywheel assembly according to claim 12, wherein said radially outer portion of said washer-shaped spring is spaced apart from said flexible plate with said flexible plate in a deflection free state.*

*16. The flywheel assembly according to claim 15, wherein said radially outer portion of said washer-shaped spring is configured to abut against said flexible plate when an amount of the bending deflection of said flexible plate exceeds a predetermined amount, said washer-shaped spring being fixed to said flexible plate.*

*17. The flywheel assembly according to claim 12, wherein said radially outer portion of said washer-shaped spring is spaced apart from said flywheel with said flexible plate in a deflection free state.*

*18. The flywheel assembly according to claim 17, wherein said radially outer portion of said washer-shaped spring is configured to abut against said flexible plate and said flywheel when an amount of the bending deflection of said flexible plate exceeds a predetermined amount.*

*19. The flywheel assembly according to claim 12, wherein said washer-shaped spring is flexible in the axial direction parallel to the crankshaft and said washer-shaped spring has axial rigidity which is higher than the axial rigidity of said flexible plate, said washer-shaped spring elastically urging said radially inner portion of said flexible plate toward said crankshaft.*

*20. The flywheel assembly according to claim 12, wherein said washer-shaped spring has a disk portion including said radially inner portion, said disk portion urging said radially inner portion of said flexible plate toward the crankshaft.*

*21. The flywheel assembly according to claim 20, wherein an outside diameter of said disk portion is larger than the diameter of the end of the crankshaft.*

*22. The flywheel assembly according to claim 21, wherein said washer-shaped spring has an annular inclined portion around said disk portion inclined toward said flywheel, said annular inclined portion having axial rigidity greater than the axial rigidity of said flexible plate.*

*23. The flywheel assembly according to claim 22, wherein said washer-shaped spring has an annular flat surface portion around said annular inclined portion, and said flywheel is provided with a flat surface opposing said annular flat surface portion of said washer-shaped spring.*

*24. The flywheel assembly according to claim 23, wherein said flexible plate is formed with a plurality of circumferentially spaced apart holes for adjusting said axial rigidity of said flexible plate.*

*25. The flywheel assembly according to claim 24, wherein said flywheel is provided with at least one hole for venting heat generated on said friction surface.*

*26. A flywheel assembly for transmitting torque from a crankshaft of an engine to a friction member of a clutch disk assembly, comprising:*

*a flywheel having a friction surface for engagement with the friction member of the clutch disk assembly and a side surface facing in an axial direction which is opposite said friction surface;*

*a flexible plate deflectable in an axial direction parallel to the crankshaft and rigid in a rotational direction of the crankshaft and said flywheel, having a radially outer portion fixed to said flywheel and a radially inner portion adapted to be fixed to an end of the crankshaft; and*

*a washer-shaped spring having a radially inner portion adapted to be fixed to the end of the crankshaft adjacent to said flexible plate and a radially outer portion spaced axially from an adjacent portion of said flexible plate such that said radially outer portion of said washer-shaped spring extends away from said adjacent portion of said flexible plate, said radially outer portion of said washer-shaped spring extending toward said flywheel, said washer-shaped spring being disposed between said flexible plate and said flywheel, said radially outer portion of said washer-shaped spring being configured for friction engagement with said side surface of said flywheel for producing a frictional damping force therewith, and said washer-shaped spring being configured for restraining movement of said flywheel when said flexible plate undergoes bending deflection, such that said radially outer portion engages said side surface of said flywheel.*

*27. The flywheel assembly according to claim 26, wherein said radially inner portions of said washer-shaped spring and said flexible plate are formed with circumferentially spaced apart bolt holes, and a plurality of bolts are adapted to extend through said bolt holes and connect said radially inner portions of said washer-shaped spring and said flexible plate to the end of the crankshaft.*

*28. The flywheel assembly according to claim 27, wherein said flywheel is formed with a plurality of holes to cover heads of said bolts, whereby interference between said bolts and said flywheel is avoided.*

*29. The flywheel assembly according to claim 26, wherein said radially outer portion of said washer-shaped spring is spaced apart from said flexible plate with said flexible plate in a deflection free state, and said radially outer portion is further spaced apart from said flywheel with said flexible plate in a deflection free state.*

*30. The flywheel assembly according to claim 29, wherein said radially outer portion of said washer-shaped spring is configured to abut against said flexible plate when an amount of the bending deflection of said flexible plate exceeds a predetermined amount, said washer-shaped spring being fixed to said flexible plate.*

*31. The flywheel assembly according to claim 26, wherein*

*said radially inner portion of said washer-shaped spring includes a conical section, said radially inner portion being configured for engagement with said flexible plate with said washer-shaped spring installed on the crankshaft, said washer-shaped spring being configured to be deformable upon installation on the crankshaft such that said conical section is elastically changed such that said radially inner portion is flattened out against an adjacent surface of said flexible plate putting said washer-shaped spring in a pre-stress state.*

*32. The flywheel assembly according to claim 26, wherein*

*said washer-shaped spring is flexible in the axial direction parallel to the crankshaft and said washer-shaped spring has axial rigidity which is higher than the axial rigidity of said flexible plate, said washer-shaped spring elastically urging said radially inner portion of said flexible plate toward said crankshaft.*

*33. A flywheel assembly for transmitting torque from a crankshaft of an engine to a friction member of a clutch disk assembly, comprising:*

*a flywheel having a friction surface for engagement with the friction member of the clutch disk assembly and a side surface facing in an axial direction which is opposite said friction surface;*

*a flexible plate deflectable in an axial direction parallel to the crankshaft and rigid in a rotational direction of the crankshaft and said flywheel, having a radially outer portion fixed to said flywheel and a radially inner portion adapted to be fixed to an end of the crankshaft; and*

*a washer-shaped spring having a radially inner portion adapted to be fixed to the end of the crankshaft adjacent to said flexible plate and a radially outer portion spaced axially from an adjacent portion of said flexible plate such that said radially outer portion of said washer-shaped spring extends away from said adjacent portion of said flexible plate, said radially outer portion of said washer-shaped spring extending toward said flywheel, said washer-shaped spring being disposed between said flexible plate and said flywheel, said washer-shaped spring being configured for restraining movement of said flywheel when said flexible plate undergoes bending deflection, such that said radially outer portion engages said side surface of said flywheel,*

*said radially inner portion of said washer-shaped spring including a conical section, said radially inner portion being configured for engagement with said flexible plate when said washer-shaped spring is installed on the crankshaft, said washer-shaped spring being configured to be deformable upon installation on the crankshaft such that said conical section is elastically changed such that said radially inner portion is flattened out against an adjacent surface of said flexible plate putting said washer-shaped spring in a pre-stress state.*

*34. The flywheel assembly according to claim 33, wherein*

*said conical section of said radially inner portion is concave on a first side adjacent to said flexible plate, when said washer-shaped spring is uninstalled with respect to said flexible plate, and said conical section of said radially inner portion is convex on a second side adjacent to said flywheel, when said washer-shaped spring is uninstalled with respect to said flexible plate.*

*35. The flywheel assembly according to claim 33, wherein*

*said radially outer portion of said washer-shaped spring is configured for friction engagement with said side surface of said flywheel for producing a frictional damping force therewith.*

*36. The flywheel assembly according to claim 33, wherein*

*said washer-shaped spring installed on the crankshaft with said flexible plate, said radially outer portion of said washer-shaped spring is spaced apart from said flexible plate with said flexible plate in a deflection free state, and said radially outer portion is further spaced apart from said flywheel with said flexible plate in a deflection free state.*

*37. The flywheel assembly according to claim 33, wherein*

*said radially outer portion of said washer-shaped spring is configured to abut against said flexible plate when an amount of the bending deflection of said flexible plate exceeds a predetermined amount, said washer-shaped spring being fixed to said flexible plate.*

*38. The flywheel assembly according to claim 33, wherein*

*said washer-shaped spring is flexible in the axial direction parallel to the crankshaft and said washer-shaped spring has axial rigidity which is higher than the axial rigidity of said flexible plate, a portion of said washer-shaped spring elastically urging said radially inner portion of said flexible plate toward said crankshaft in response to said pre-stressed state.*

* * * * *